US008630287B2

(12) United States Patent
Nachum et al.

(10) Patent No.: US 8,630,287 B2
(45) Date of Patent: Jan. 14, 2014

(54) MULTIPLE CORE NETWORK DEVICE WITH CORE REDUNDANCY

(75) Inventors: Youval Nachum, Holon (IL); Amit Avivi, Tel Mond (IL); Ehud Sivan, Zichron Ya'Akov (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 169 days.

(21) Appl. No.: 13/214,820

(22) Filed: Aug. 22, 2011

(65) Prior Publication Data

US 2012/0044948 A1  Feb. 23, 2012

Related U.S. Application Data

(60) Provisional application No. 61/375,528, filed on Aug. 20, 2010.

(51) Int. Cl.
*H04L 12/50* (2006.01)

(52) U.S. Cl.
USPC ............................................ 370/386

(58) Field of Classification Search
USPC ......... 370/216–228, 241, 242, 244, 250, 252, 370/254, 351, 386, 400–401, 428–429, 463
See application file for complete search history.

(56) References Cited

U.S. PATENT DOCUMENTS

| 5,953,314 | A  | * | 9/1999 | Ganmukhi et al. ........... 370/220 |
| 6,894,969 | B1 | * | 5/2005 | Chidambaran et al. ....... 370/216 |
| 6,895,528 | B2 | * | 5/2005 | Cantwell et al. ................ 714/12 |
| 7,328,371 | B1 | * | 2/2008 | Kalyanasundharam et al. .............................. 714/11 |

FOREIGN PATENT DOCUMENTS

WO  WO 2008/047179  *  4/2008

OTHER PUBLICATIONS

U.S. Appl. No. 12/706,704, filed Feb. 16, 2010, First Named Inventor—Aviran Kadosh.

* cited by examiner

*Primary Examiner* — Frank Duong (57) ABSTRACT

An embodiment of a network device includes a plurality of switch cores and a plurality of ports for receiving and transmitting data frames on a network disposed on a single integrated circuit, where switch core is coupled to a subset of the plurality of ports. The network device includes a deactivator configured to selectively deactivate at least a portion of one or more switch cores among the plurality of switch cores on the single integrated circuit, and the network device is configured to forward data frames among the plurality of ports based on a configuration of active portions of the plurality of switch cores. The deactivated portions may include ingress processing pipelines, egress processing pipelines, and/or entire switch cores. The portions of the switch cores to be deactivated may be dynamically be determined based on connectors of the integrated circuit.

20 Claims, 7 Drawing Sheets

MULTIPLE CORE NETWORK DEVICE WITH CORE REDUNDANCY

CROSS-REFERENCE TO RELATED APPLICATIONS

This application claims the benefit of U.S. Provisional Patent Application No. 61/375,528 entitled "Switch with Core Redundancy" filed on Aug. 20, 2010, the entire disclosure of which is hereby incorporated by reference herein.

FIELD OF THE DISCLOSURE

The present disclosure relates generally to communication networks and, more particularly, to network or switching devices used in communication networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching among a large number of ports. U.S. patent application Ser. No. 12/706,704, filed on Feb. 16, 2010 and entitled "SWITCH DEVICE HAVING A PLURALITY OF PROCESSING CORES," describes a switch device with a plurality of processing cores that provides forwarding functionality among a relatively large number of ports.

SUMMARY

In an embodiment, a network device includes a plurality of ports for receiving and transmitting data frames on a network, and a plurality of switch cores disposed on a single integrated circuit. Each switch core is coupled to a subset of the plurality of ports. The network device further includes a deactivator configured to selectively deactivate at least a portion of one or more switch cores among the plurality of switch cores on the single integrated circuit. The network device is configured to forward data frames among the plurality of ports based on a configuration of active portions of the plurality of switch cores.

In an embodiment, a method includes selectively deactivating at least a portion of one or more switch cores among a plurality of switch cores disposed on a single integrated circuit of a network device. Each switch core is coupled to a subset of a plurality of ports, where the plurality of ports is for receiving and transmitting data frames on a network that includes the network device. The method further comprises configuring the network device to forward data frames among ports corresponding to the active portions of the plurality of switch cores, where the configuring of the network device is based on the active portions of the plurality of switch cores.

DETAILED DESCRIPTION

Example switching methods and apparatus are described herein in the context of Ethernet networks. It is noted, in light of the disclosure and teachings herein, that similar methods and apparatus are suitable to be utilized in other communication networks as well.

Figure 1:
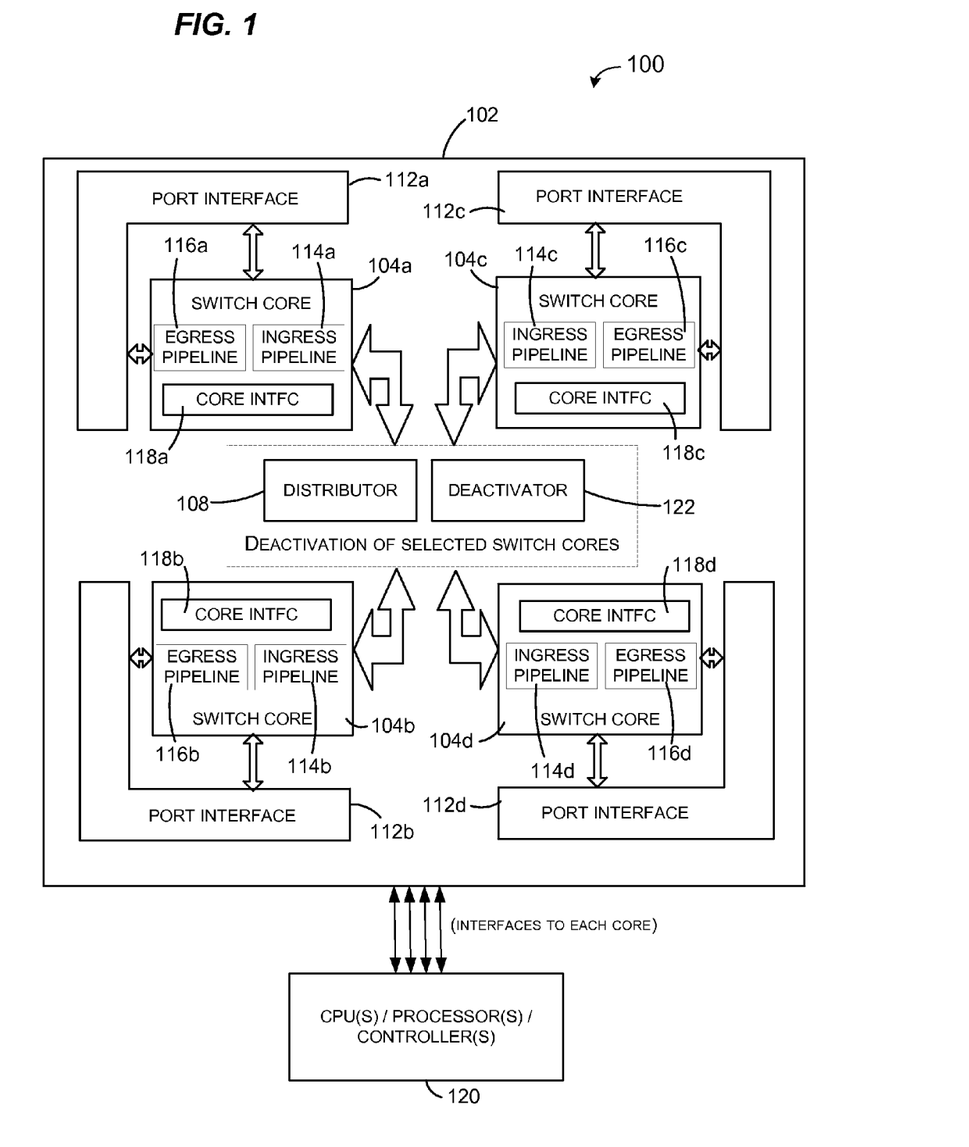
FIG. 1 is a block diagram of an example forwarding system including an integrated circuit (IC) that is utilized in a switching device, according to an embodiment.

FIG. 1 is a block diagram of an example forwarding system 100 that is utilized in a switch device, such as an Ethernet switch, in some embodiments. A description of a forwarding system similar to the forwarding system 100 is found in U.S. application Ser. No. 12/706,704, filed on Feb. 16, 2010 and entitled "Switch Device Having a Plurality of Processing Cores," the entire disclosure of which is incorporated herein by reference. In some embodiments, however, the forwarding system 100 includes aspects that are different than those described in U.S. application Ser. No. 12/706,704.

The forwarding system 100 includes a network device including an integrated circuit (IC) 102 having a plurality of switch cores 104a-104d disposed on the IC 102 and coupled together via a distributor 108 and activator 122. The combination of the distributor 108 and the activator 122 is configured to selectively deactivate one or more of the switch cores 104a-104d or portions thereof. As such, the network device is configured to forward data frames among ports of the IC 102 based on a configuration of active portions of the switch cores 104a-104d.

Typically, the integrated circuit (IC) 102 is a single integrated circuit, however, the integrated circuit 102 includes more than one IC in some embodiments. Additionally, each switch core 104 is coupled with a corresponding port interface 112a-112d, and each port interface 112 supports coupling to a plurality suitable ports, which in accordance with embodiments of the disclosure are optical and/or electrical ports. It is noted that, in light of the disclosure and teachings herein, the IC 102 suitably enables switch devices capable of switching packets or data frames between a relatively high number of ports and in a small form factor, in at least some embodiments. For example, in one embodiment, the IC 102 is capable of switching between at least 96 one Gigabit per second (1 Gbps) ports. In other embodiments, the IC 102 is capable of switching between at least 96 10 Gbps ports. Other embodiments of the IC 102 are possible, such an embodiment that is capable of switching between at least 32 ports of 40 Gbps, an embodiment that is capable of switching between at least 12 ports of 100 Gbps, or other embodiments. It is noted that, in light of the disclosure and teachings herein, switch devices capable of switching between a high number of ports and in a small form factor are useful for applications such as data centers and server farms, for example.

Although FIG. 1 illustrates four switch cores 104, in other embodiments, less than four (i.e., two or three) or more than four switch cores 104, with the corresponding number of port interfaces 112, are included on the IC 102. In an embodiment, each of switch cores 104 is a dual core that includes two single cores. In this embodiment, the IC 102 thus includes eight switch cores. In another embodiment, the IC 102 includes eight switch cores 104, none of which is part of a dual core.

Each of the switch cores 104 is independent from all other switch cores 104 disposed on the IC 102, in an embodiment. For example, each independent switch core 104 operates whether or not another switch core 104 is operating, in an embodiment. In an embodiment, each switch core 104 is a dual core having two single cores, the single cores in the dual switch core 104 are not independent, and each dual switch core 104 is independent of other dual switch cores and of other single switch cores. In another embodiment in which each switch core 104 is a dual core having two single cores, the single cores in the dual switch core 104 are independent. In some embodiments, not all switch cores 104 are independent. In an embodiment, at least one switch core 104 is independent of all other switch cores 104 disposed on the IC 102.

In an embodiment, the distributor 108 comprises a plurality of distributor modules. For example, in an embodiment, each distributor module is coupled to every switch core 104 and is capable of directing or transferring data frames or data frame information from any switch core 104 to any switch core 104. In an embodiment in which the distributor 108 comprises a plurality of independent distributor modules, and each distributor module operates whether or not another distributor module is operating.

According to one embodiment, each switch core 104 is associated with a corresponding port interface 112, which handles ports local to the switch core 104. As such, each switch core 104 is locally coupled to a subset of the plurality of ports on the IC 102, referred to herein as "local ports." For example, the ports handled by port interface 112a are considered local ports of the switch core 104a. Similarly, the ports handled by port interface 112b are considered local ports of the switch core 104b. On the other hand, the ports handled by the port interface 112a are considered non-local or remote ports to the switch cores 104b, 104c and 104d, and the ports handled by the port interface 112b are considered non-local or remote ports to the switch cores 104a, 104c and 104d.

Generally, when a switch core 104 receives a data frame corresponding to a packet via a local source port, the switch core 104 determines the target port to which the data frame should be transmitted, which may or may not be a local port respective of the receiving switch core 104. If the target port is not a local port of the receiving switch core, the switch core 104 performs some, but not all, processing operations on the received data frame and then transmits the data frame to the distributor 108. The distributor 108 subsequently directs or transfers the data frame or the data frame information to the appropriate other switch core 104 with respect to which the target port is a local port. Processing operations on the data frame are completed at the switch core 104 associated with the target port. For example, when a data frame is received by the switch core 104a via a local port of the switch core 104a, the switch core 104a determines the target port. If the target port corresponds to the switch core 104d, for example, the switch core 104a transmits the data frame to the distributor 108, which then transfers or directs the data frame to the switch core 104d. Next, the switch core 104d forwards the data frame to the target port, which is a local port of the switch core 104d. In the example, some processing operations on the data frame, typically ingress processing operations (such as determining values of attributes of the packet that influence the actions to be performed during the forwarding of the packet), are performed at the receiving switch core 104a, while additional processing operations on the data frame, typically egress processing operations (such as scheduling and queuing the packet for transmission), are performed at the switch core 104d. Accordingly, each switch core 104 includes an ingress pipeline 114 (also referred to herein as an "ingress processing pipeline") that performs ingress processing operations, and includes an egress pipeline 116 (also referred to herein as an "egress processing pipeline") that performs egress processing operations.

In an embodiment, a given switch core 104 always forwards data frames to the distributor 108 irrespective of whether the target port for a data frame is a local port of the given switch core 104, or is a remote port relative to the given switch core 104. In another embodiment, a switch core 104 does not forward a data frame to the distributor 108 if the target port is a local port of the switch core 104. Rather, in such other embodiments, when the target port is a local port of the given switch core 104, the data frame is further processed by the given switch core 104 without being provided to the distributor 108.

In an embodiment, data frames corresponding to packets, when received via a port interface 112, are stored in a memory of the IC 102 (not shown in FIG. 1) and remain in the same location while descriptors corresponding to the data frames are being processed by switch cores 104 and the distributor 108. In one example, a pointer or other identifier of a data frame is passed between a switch core 104 and the distributor 108, or between switch cores 104. Thus, although switch cores 104 were described above as sending or forwarding data frames to the distributor 108 or another switch core 104, in an embodiment, sending or forwarding a data frame between a switch core 104 and the distributor 108, or between switch cores 104 comprises sending a pointer or other identifier of a data frame stored in a memory and/or a sending a descriptor associated with the data frame or a pointer to the descriptor. In other embodiments, sending or forwarding a data frame between a switch core 104 and the distributor 108, or between switch cores 104, comprises sending the actual data frame. In an example, forwarding data frames corresponding to packets using the IC 102 is performed with techniques such as described in U.S. patent application Ser. No. 12/706,704, filed on Feb. 16, 2010 and entitled "SWITCH DEVICE HAVING A PLURALITY OF PROCESSING CORES," the entire contents of which are hereby incorporated by reference.

Each independent switch core 104 includes a core interface 118 to interface with a central processing unit (CPU) or other suitable processor 120. In an embodiment, the CPU 120 comprises a processor that executes machine readable instructions stored in a memory (not shown). In an embodiment, the CPU is included on the same silicon or device as the IC 102. In another embodiment, the CPU may be on a different silicon or device. In some embodiments, more than one CPU 120 is included in the forwarding system 100. For example, each switch core 104a-104d interfaces with a respective CPU 120 in an embodiment. As used herein, the terms "CPU," "processor," and "controller" are used interchangeably to indicate the CPU 120. Each core interface 118 permits the CPU 120 to communicate with a respective switch core 104. In one embodiment, each core interface 118 comprises a CPU port (e.g., a gigabit media independent interface (GMII) or other suitable interface) and/or a serial management interface (SMI), or any suitable interface(s).

At least one of the core interfaces 118 also permits the CPU 120 to communicate with a deactivator 122, in an embodiment. In an embodiment, one of the core interfaces 118 is designated or selected to be an interface between the IC 102 and the controller 120. For example, all active cores 104 and the deactivator 122 on the IC 102 communicate with the controller 120 using the designated or selected core interface.

The deactivator 122 is configured to initiate a selective deactivation and/or isolation of at least a portion of at least one of the switch cores 104. For example, after production, a particular switch core on a device may be determined to be defective, and the defective switch core is deactivated by the deactivator 122 to allow the device to be used in a limited manner, e.g., for applications that do not require a full set of activated switch cores. A deactivation of an entire switch core 104 includes, in an embodiment, shutting down the switch core 104 or preventing the switch core 104 from powering up so that the switch core 104 does not process any data frames or packets. An isolation of an entire switch core 104 includes, in an embodiment, preventing data frames or packets from being transmitted to and received from the switch core 104. In some embodiments, the deactivator 122 is configured to deactivate and/or isolate at least a portion of the at least one switch core 104, such as an ingress pipeline or an egress pipeline of the at least one switch core 104.

The deactivator 122 determines the one or more switch cores or portions thereof to be deactivated based on information available on the IC 102, in an embodiment. In an embodiment, a configuration identifier (ID) indicates which switch cores 104 or portions thereof should be deactivated, and the configuration ID is accessible by the deactivator 122. In an embodiment, the configuration ID is stored in a memory unit such as a register, a read-only memory (ROM), etc., on the IC 102, in an embodiment. In an embodiment in which the configuration ID is stored in a ROM memory unit, the ROM memory unit is programmed to store the configuration ID during a manufacturing process, for example. The configuration ID may be stored into the memory unit by the CPU 120, in an embodiment.

In an embodiment, the configuration ID corresponds to a plurality of bit signals. In an embodiment, the plurality of bit signals are generated by coupling a plurality of signal lines on the IC 102 to one or more reference signals, such as ground and power signals, where the plurality of signal lines correspond to the plurality of bit signals. For example, in an embodiment, each signal line is directly connected to one of the reference signals via a pull-up/pull-down resistor, a bump, a pin, etc. In an embodiment, the plurality of signal lines are coupled to a memory unit such as a register, and the configuration ID is loaded into the register at certain times such as upon power-up of the IC 102, reset of the IC 102, etc. In another embodiment, the configuration ID is received via the CPU 120 and loaded into the memory unit.

The embodiment illustrated in FIG. 1 depicts the deactivator 122 as a centralized block coupled to each switch core 104. In other embodiments, however, the deactivator 122 is distributed across switch cores 104. For example, a deactivator for independent switch core 104a is included in switch core 104a, a deactivator for independent switch core 104b is included in switch core 104b, and so on. In some embodiments having distributed deactivators, each distributed deactivator is included as part of the core interface 118 of the switch core 104. Deactivation of switch cores 104 or portions thereof are described in further detail in a later section.

Figure 2A:
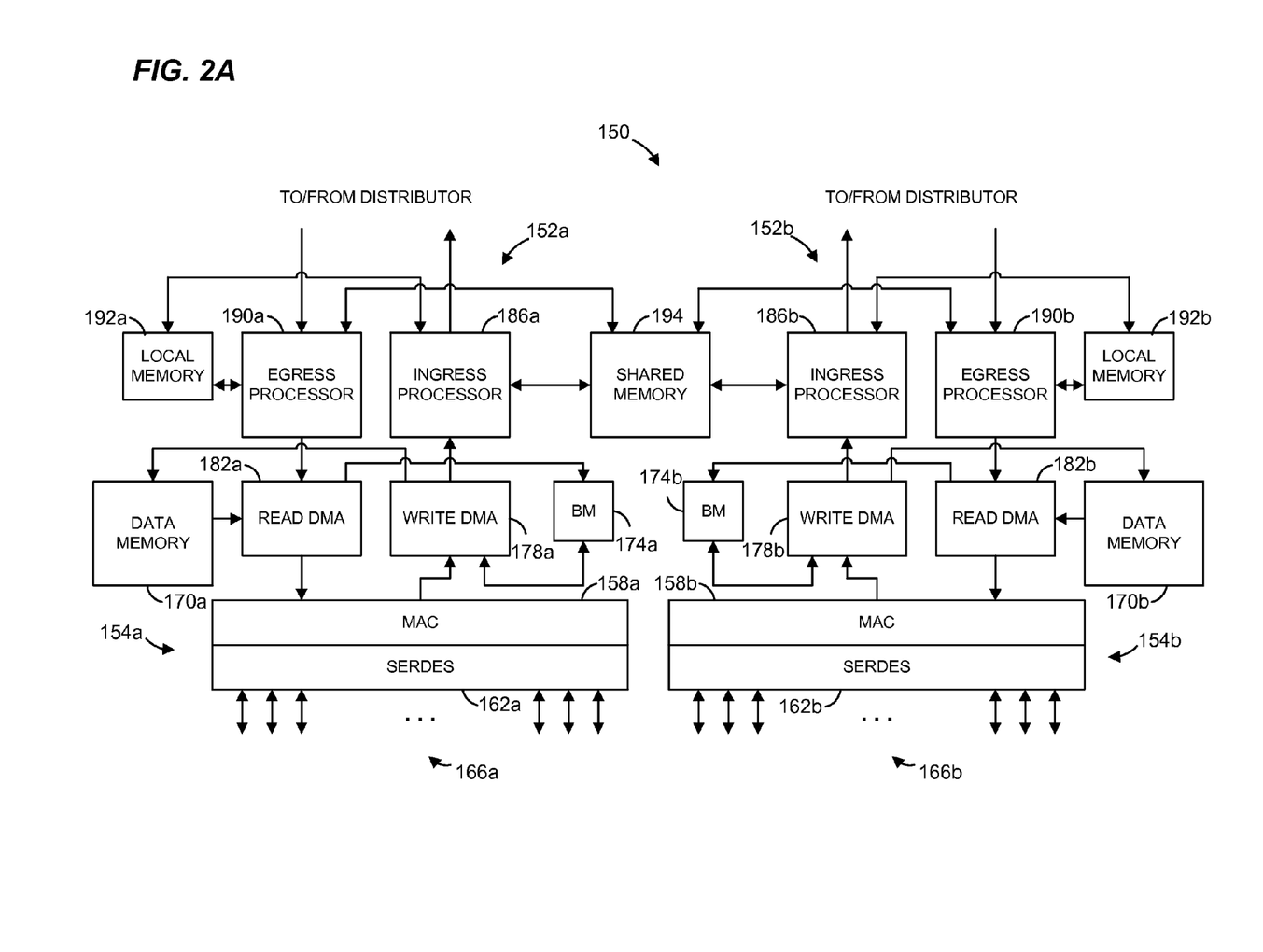
FIG. 2A is a block diagram of an example implementation of a switch core that is utilized for the integrated circuit of FIG. 1, according to an embodiment.

FIG. 2A is a block diagram of an example dual switch core 150 that is utilized for each switch core 104/port interface 112 pair of FIG. 1, in an embodiment. The dual switch core 150 includes a first single switch core 152a and a second single switch core 152b, i.e., an "a" side and a "b" side. For ease of reading, as used herein, reference numbers without an "a" or "b" suffix (e.g., 152, 154, etc.) refer to both the "a" and the "b" sides, in a respective manner.

Each single switch core 152 includes a port interface 154 that in an embodiment corresponds to a port interface 112 of FIG. 1. The port interface 154 includes a media access control (MAC) block 158 and a serializer/deserializer (SERDES) block 162. The SERDES block 162 generates and receives a plurality of serial signals 166 corresponding to a plurality of local ports of the switch core 150. In one embodiment, the plurality of serial signals 166 includes Reduced 10 Gigabit Attachment Unit Interface (RXAUI) signals such as disclosed in U.S. patent application Ser. No. 12/621,268, filed Nov. 18, 2009, entitled "HARDWARE INTERFACE UTILIZING ALIGNMENT SYMBOLS FOR DEMULTIPLEXING," which is hereby incorporated by reference herein. Additionally or alternatively, the plurality of serial signals 166 includes 10 Gigabit Attachment Unit Interface (XAUI) signals according to the IEEE 802.3ae Standard in accordance with an embodiment, and/or other suitable signals.

In one embodiment, the MAC block 158 includes a plurality of MAC processors, wherein each MAC processor corresponds to a port. For example, each MAC processor implements MAC functions in conjunction with the port to which the MAC processor corresponds, according to an embodiment. In an embodiment, each MAC processor implements MAC functions that conform to the IEEE 802.3 Standard. In other embodiments, other suitable MAC functions are implemented. In an embodiment, the SERDES block 162 includes a plurality of SERDES, wherein the plurality of SERDES is grouped according to ports, i.e., each group of SERDES corresponds to a port. For example, in one embodiment, each group of two SERDES corresponds to a port. In another embodiment, each group of four SERDES corresponds to a port. Other numbers of SERDES per group are utilized as well, in some embodiments. In one embodiment, the number of SERDES in a group that corresponds to a port is configurable. In another embodiment, the number of SERDES in a group that corresponds to a port is fixed and nonconfigurable. Generally, SERDES grouping is flexible and is determined by port configuration or interface selection, in some embodiments.

Each single switch core 152 further includes a data memory 170, a buffer management unit 174, a write direct memory access (DMA) unit 178, and a read DMA unit 182. According to an embodiment, the buffer management unit 174 allocates buffers in the data memory 170 for storing data frames received via the SERDES block 162. For example, when a data frame is received via the SERDES block 162, the buffer management unit 174 allocates a buffer for the data frame, if warranted, and the write DMA writes information from the data frame into the data memory 170 at locations corresponding to the allocated buffer. The buffer management unit 174 provides the write DMA unit 178 with information regarding the location of the allocated buffer. When a data frame is to be transmitted via the SERDES block 162, the read DMA unit 182 reads data frame data from the allocated buffer and provides the data frame data to the MAC block 158. In an embodiment, the read DMA unit 182 indicates to the buffer management unit 174 that an allocated buffer is available to be deallocated because the data frame has been provided to the MAC block 158 for transmission via a port.

An ingress processor 186 processes (or "ingress-processes") data frames received via the port interface 154. The ingress processor 186 generally determines how the data frame should be forwarded. For example, the ingress processor 186 generally processes the data frame to determine the target port to which the data frame is to be egressed. The target port is a port that is local to the switch core 150, or the target port is a port that is non-local to the switch core 150, i.e., the target port is a port of the same switch core or a port of another switch core. The target port is indicated by a port number or other suitable indicator. In an embodiment, the target port indicator determined by the ingress processor 186 is unique for multiple switch cores 104, 150 of the IC 102 (e.g., all switch cores 104, 150 of the IC 102), whereas a source port indicator is unique only for the switch core 150 to which the data frame is ingressed. In an embodiment, after determining the target port for a data frame, the ingress processor 186 sends the data frame to the distributor. The term "ingressing port" is sometimes used herein to refer to the source port via which a data frame is received. The term "egressing port" is sometimes used herein to refer to the target port via which a data frame is transmitted.

An egress processor 190 processes (or "egress-processes") data frames received via the distributor. The egress processor 190 generally performs various egress processing operations and forwards data frames to the target port indicated by the target port indicator.

A local memory 192 stores databases or tables utilized by the ingress processor 186 and the egress processor 190, such as a forwarding database (FDB), a next hop table, policy control list (PCL) data, VLAN data, multicast group data, etc. In an embodiment, the memory 192 includes one or more ternary content addressable memories (TCAMs), for example, to store one or more of FDB data, next hop data, PCL data, VLAN data, multicast group data, etc. corresponding to local ports of a switch core 104.

Referring now to FIGS. 1 and 2A, in an embodiment, all switch cores 104a-104d of the IC 102 are associated with the same device number, where the same device number corresponds to the IC 102. In an embodiment, each port of the IC 102 has a unique global port indicator (e.g., number) that is unique across all switch cores 104a-104d. Similarly, in an embodiment, each port of the IC 102 has a local port indicator that is unique within its respective local switch core 104a-104d, and may or may not be unique across other non-local switch cores.

As such, in some embodiments, the local memory 192 of a particular switch core includes one or more TCAMs to store one or more of FDB data, next hop data, PCL data, VLAN data, multicast group data, etc. that is unique to non-local ports of other switch cores disposed on the IC 102. For a particular independent switch core, in some embodiments, the non-local port information is stored locally at the particular independent switch core, and other switch cores are unable to access the local memory 192. That is, the non-local port information is not stored in a shared memory that is accessible by other switch cores disposed on the IC 102. In this manner, the particular independent switch core does not rely on other switch cores for information regarding non-local ports, and accordingly is configured and enabled to operate (e.g., process packets) independently of other switch cores disposed on the IC 102. For example, the particular independent core forwards packets or data corresponding to packets irrespective of whether or not other cores are activated or deactivated. Deactivation of switch cores is discussed in more detail in subsequent sections.

In some embodiments, as previously discussed, in addition to a global port indicator, each port of the IC 102 also has a local port indicator (e.g., number) that is unique with respect to the associated switch core 104, 150, but is not unique with respect to other ports associated with other switch cores 104, 150 disposed in IC 102. In an embodiment, each switch core refers to a particular local port using a respective local port indicator, a respective global port indicator, or either port indicator. In an embodiment, the ingress processor 186 utilizes local source port indicators (i.e., local to the switch core 150) and/or global target port indicators when processing an ingressing data frame or descriptor. Additionally, the egress processor 190 utilizes local target port indicators (i.e., local to the switch core 150) and/or global source port indicators when processing an egressing data frame or descriptor.

In accordance with an embodiment, FDB data, next hop data, PCL data, VLAN data, multicast group data, etc., is more efficiently stored in the local memory 192 for use by the switch cores 104, 152 as compared to storing the same data for all of the switch cores 104, 150. For example, PCL data, VLAN data, multicast group data, etc., that is unique to local ports of a switch core 104, 150 is stored in the local memory 192, whereas this data is not stored in other memories of other switch cores 104, 152. Similarly, PCL data, VLAN data, multicast group data, etc., for other non-local ports is omitted from the local memory 192. On the other hand, some data, such as FDB data, next hop data, etc., is stored in each associated local memory 192 of all of the switch cores 104, 152, or otherwise provided to all the switch cores 104, 152. For example, in an embodiment, the dual switch core 150 includes a shared memory 194 that is coupled to both of the individual switch cores 152. In this embodiment, at least some data utilized only by the individual switch core 152a is stored in the local memory 192a, whereas other data, such as data utilized by both individual switch cores 152, is stored in the shared memory 194.

In an embodiment, the shared memory 194 is omitted and data utilized by the individual switch cores 152 are stored in the local memories 192. In another embodiment, the local memories 192 are omitted and data utilized by the individual switch cores 152 are stored in the shared memory 194.

Figure 2B:
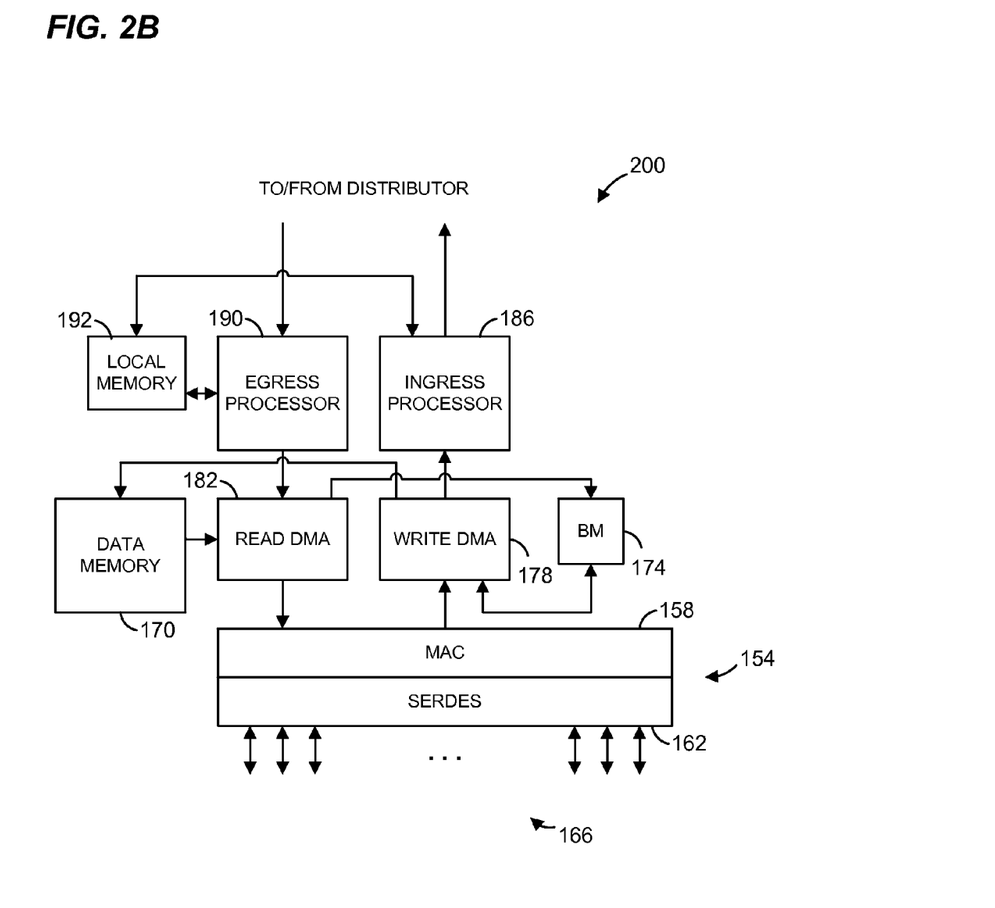
FIG. 2B is a block diagram of another example implementation of a switch core that is utilized for the integrated circuit of FIG. 1, according to an embodiment.

FIG. 2B is a block diagram of another example switch core 200 that is utilized for each switch core 104/port interface 112 pair of FIG. 1, in an embodiment. The switch core 200 is similar to each single switch core 152 of FIG. 2A, and like numbered elements are therefore not discussed. The switch core 200 omits the shared memory 194 (FIG. 2B), in an embodiment. Thus, data utilized by the switch core 200 (e.g., FDB data, next hop data, PCL data, VLAN data, multicast group data, etc.) are stored in the local memory 192.

Referring again to FIG. 1, in an embodiment, a first portion of the switch cores 104a-104d may be dual switch cores such as the dual switch core 150 described in FIG. 2A, and a second portion of the switch cores 104a-104d may be single switch cores such as the single switch core 200 described in FIG. 2B. For example, switch cores 104a and 104d are each dual switch cores, and switch cores 104b and 104c are each single switch cores.

As previously discussed, all switch cores 104 on the IC 102 are associated with the same device number corresponding to the IC 102, but each port of the IC 102 has a unique global port indicator (e.g., number), in an embodiment. As such, in a scenario using this embodiment, another switching device separate from the IC 102 indicates that a packet should be egressed from a particular port of the IC 102 by providing a device number of the IC 102, which is common to all of the switch cores 104 on the IC 102, and a global target port indicator corresponding to the particular port from which the packet should be egressed. This is in contrast to a configuration of another embodiment, for example, in which each switch core 104 on the IC 102 has a separate device number, and the other switching device separate from the IC 102 indicates that a packet should be egressed from a particular port of the IC 102 by providing a device number of one of the switch cores 104 on the IC 102 and a local target port indicator, i.e., local to the particular switch core 104 indicated by the device number. Each switch core 104 is associated with local ports, and each port of the IC 102 has a local port indicator (e.g., number). The local port indicator is unique with respect to ports of the corresponding switch core 104 with which the port is associated, but is non-unique with respect to ports of other switch cores 104 in the same switch, for example the other switch cores 104 that are disposed on a single IC 102.

As previously discussed with respect to FIG. 1, in an embodiment, at least one switch core 104 is configured to operate independently of other switch cores 104 disposed on the IC 102. In particular, each independent switch core forwards packets or data corresponding to packets irrespective of whether or not the other switch cores are activated or deactivated. For example, power to a particular independent switch core is shut down to deactivate the particular independent switch core and prevent data frames from being processed by the particular independent switch core, while power is delivered to other independent switch cores so that the other independent switch cores continue to process data frames.

The deactivator 122 is configured to initiate a deactivation of one or more independent switch cores 104, or at least a portion of one or more independent switch cores 104, such as an entire single switch core within a dual core 104, the ingress pipeline 114, the egress pipeline 116, or another portion. In other words, the deactivator 122 initiates a placement of the at least a portion of the one or more independent switch cores 104 into a deactivated state so that the one or more independent switch cores 104 do not process packets or data frames. In an embodiment, the deactivator 122 determines the one or more switch cores 104 or portions thereof (e.g., the ingress processing pipeline or the egress processing pipeline) to be deactivated or to be placed in a deactivated state based on information generated or communicated by the CPU 120.

In an embodiment, the deactivator 122 also configures the distributor 108 to ignore data frames or data frame information received from deactivated cores 104 and to prevent the distributor from routing at least some data frames or data frame information to deactivated cores 104. In some embodiments, the deactivator 122 additionally configures the distributor 108 to ignore data frames or data frame information that are received from an activated core and intended to be forwarded or routed to a deactivated core. As such, the distributor 108 routes or forwards data frames or data frames amongst a configuration of only active cores or active portions of switch cores. As discussed above, the deactivator 122 determines the one or more switch cores or portions thereof to be deactivated based on information available on the IC 102, such as information stored in a configuration ID or other memory unit, in an embodiment.

This ability to deactivate switch cores 104 or portions thereof provides various advantages over current ICs and techniques, in at least some embodiments and/or implementations.

For example, the techniques described herein produce greater manufacturing yields as compared with current techniques, in some embodiments. For example, when one of the switch cores of a prior art multi-core IC fails a testing screen or portion thereof, or otherwise fails to qualify during the manufacturing process, the entire current IC is discarded and rendered unusable. Some applications, such as Ethernet switching, require ICs with extremely large die sizes (e.g., greater than 500 mm$^2$), and discarded ICs negatively impact an already relatively low yield. However, by using the techniques described herein, in an embodiment a multiple core networking device is modularized. In other words, if a result of a test indicates that only a part of a particular switch core 104 failed, and/or if a result of a qualification indicates that only a part of the particular switch core 104 failed to qualify, the entire IC 102 does not have to be discarded. Instead, in an embodiment, the deactivator 122 simply deactivates or isolates the particular failed switch core 104 (or the failed portion of the particular switch core 104). As a result, in an embodiment, the routing of processing performed on packets within the multiple core processor is redefined so that the remainder of fully qualified switch cores 104 and/or portions thereof remain active, functional and operational. Thus, with the techniques described herein, the entire IC 102 is not wasted but instead remains at least partially useable—perhaps not for a maximal application, use or profile that requires all cores on the IC 102 to be active, but for other applications, uses or profiles in which a subset of active cores is sufficient. Consequently, IC manufacturing yields are increased as partially functional switch devices that are still serviceable for use in devices that have less than maximal functionality are saved.

Another advantage afforded by at least some embodiments and/or implementations of techniques described herein enable a particular IC 102 to be configured with some number of inactive cores 104 as desired for various applications, uses, profiles and/or marketing considerations even when all cores 104 are fully tested and qualified. As such, a single base configuration of the IC 102 is adaptable for different applications, uses, profiles and/or markets simply by deactivating one or more desired switch cores 104. For example, different applications, uses, profiles, or markets use or require different numbers of active cores 104, such as two active cores 104, four active cores 104, eight active cores 104 or some other suitable number of active cores 104. With at least some embodiments and/or implementations of techniques described herein, an IC manufacturer is able to use a same manufacturing run to produce a base configuration, for example, the configuration 102 of FIG. 1 with four available switch cores 104. Based on customer requirements or marketing considerations, however, the deactivator 122 deactivates a suitable number of switch cores (e.g., one, two or three cores) of the base configuration to adjust the based configuration for various applications, uses, profiles and/or target markets. For example, for a first application, an IC 102 with only two active cores 104 is configured by the deactivator 122 to provide only two active cores 104, while for another application, all four switch cores 104 disposed on the IC 102 remain active. Thus, a common manufacturing process for a common base configuration of the IC 102 is easily adapted to service multiple different applications and marketing needs.

Deactivation of a switch core includes shutting down a switch core 104 or preventing the switch core 104 from powering up, in an embodiment. Shutting down a switch core 104 includes powering down a switch core 104 or preventing the switch core 104 from powering up, in an embodiment. Shutting down a switch core 104 includes opening one or more switch devices to isolate one or more power sources, ground, etc., from the deactivated core 104, in an embodiment. Shutting down a switch core 104 also includes opening one or more switch devices to prevent or minimize leakage power from the deactivated core 104, in an embodiment. As such, power leakage and total power consumed by a switching device having one or more deactivated switch cores 104 is reduced. In other embodiments, a suitable circuit is used to isolate the switch core 104 from the one or more power sources, ground, etc.

In an embodiment, connections or contacts to the IC 102 are changed (as compared to a contact configuration of the IC 102 when no switch cores 104 are deactivated) so that at least some contacts that would otherwise be allocated to deactivated switch cores are not allocated. Contacts or connections to the IC 102 include, for example, pins, solder bumps, or other suitable contact technologies. In another embodiment, the IC 102 is configured with less contacts (as compared to a configuration utilized when no switch cores 104 are deactivated) because at least some contacts that would otherwise be needed for deactivated switch cores 104 will no longer be needed. In an embodiment, the desired contacts are configured using a dynamic, real-time programming of the IC 102 using a technique such as eFuse.

As discussed above, the deactivator 122 determines the one or more switch cores or portions thereof is to be deactivated based on information available on the IC 102, in an embodiment. During manufacturing, the IC 102 is configured so that the information is available on the IC 102, in an embodiment. For example, the information corresponds to a plurality of bit signals on the IC 102, and the plurality of bit signals correspond to a plurality of signal lines on the IC 102, in an embodiment. In this embodiment, during the manufacturing process, the plurality of signal lines are coupled to one or more reference signal lines, pads, solder bumps, or other contacts to references such as ground and power signals, so that the plurality of signal lines provide the plurality of bit signals when the IC 102 is powered-up, and wherein the plurality of bit signals indicate the one or more switch cores 104 or portions thereof to be deactivated. In some embodiments, the plurality of signal lines are coupled to the one or more reference signal lines, pads, solder bumps, or other contacts during the manufacturing process using a suitable technique such as wire bonding, flip chips with bump I/Os, or similar. In some embodiments, dynamic real-time reprogramming techniques such as eFuse are used. In an embodiment, the plurality of signal lines are coupled to a memory unit such as a register, and the information indicating the one or more switch cores or portions thereof to be deactivated is loaded into the register at certain times such as upon power-up of the IC 102, reset of the IC 102, etc. As such, the cores or the portions thereof that are desired to be deactivated are determined based on available contacts of the IC 102 upon power up or reset, in this embodiment.

In another embodiment, the information indicating the one or more switch cores or portions thereof to be deactivated is stored in a non-volatile memory unit, such as a ROM, on the IC 102. In an embodiment, during the manufacturing process, the non-volatile memory unit is programmed to store the information indicating the one or more switch cores or portions thereof to be deactivated, for example.

In another embodiment, the information indicating the one or more switch cores or portions thereof to be deactivated corresponds to a plurality of bit signals on the IC 102, and the plurality of bit signals correspond to a plurality of contacts (e.g., pins, solder bumps, etc.) of the IC 102, in an embodiment. In an embodiment, the IC 102 is mounted on a printed circuit board (with or without a ball grid array substrate (BGA) or other suitable package device), and the plurality of contacts corresponding to the plurality of bit signals are coupled to one or more reference signals, such as ground and power signals, so that the plurality of bit signals are provided when the IC 102 is powered-up, and wherein the plurality of bit signals indicate the one or more switch cores 104 or portions thereof to be deactivated.

In another embodiment, the information indicating the one or more switch cores or portions thereof to be deactivated is received via the CPU 120 and loaded into a memory unit of the IC 102.

As discussed above, in some embodiments, in addition or instead of deactivating the switch core 104 so that the switch core 104 does not process data frames or packets, the switch core 104 is isolated so that data packets or frames sent to or received from the isolated switch core 104 are ignored or prevented from being routed. In an example, the distributor 108 ignores all packet frames sent to or received from the switch core 104. The deactivator 122 initiates the isolation of the switch core 104 by communicating to the distributor 108 one or more indications of one or more switch cores 104 or portions thereof are to be isolated, in an embodiment. In these embodiments, based on the indication of the switch cores 104 or portions thereof that are desired to be isolated, the distributor 108 ignores any and all packets or data frames received from isolated switch cores 104, while packets or data frames received from activated switch cores 104 are processed by the distributor 108. In these embodiments, the distributor 108 additionally ignores any and all packets or data frames that are received from activated switch cores and that are intended to be forwarded or routed to isolated switch cores, e.g., all packets or data frames associated with target egress ports corresponding to the isolated switch cores. In an embodiment, the deactivator 122 initiates the isolation of the switch core based on a configuration identifier. In an embodiment, the deactivator 122 initiates the isolation of the switch core based on an indication from the CPU 120.

In another embodiment, the deactivator 122 and distributor 108 cooperate to re-route data packets around deactivated or isolated switch cores or portions thereof, so that internal routing of packets within the IC 102 entirely bypasses or ignores the presence of the deactivated or isolated switch cores, their associated ports, and physical components. Packets originally destined for a switch core or portion thereof that is deactivated are re-routed within the IC 102 using activated switch cores, in an embodiment. As a result, the ports associated with a deactivated core will not even receive (or transmit) traffic to begin with. Accordingly, the re-routing allows the forwarding system 100 to include a dynamic redundancy between switch cores 104a-104d.

Any of the above deactivation and/or isolation techniques as well as other deactivation and/or isolation techniques may be used singly or may be used in combination.

Figure 3A:
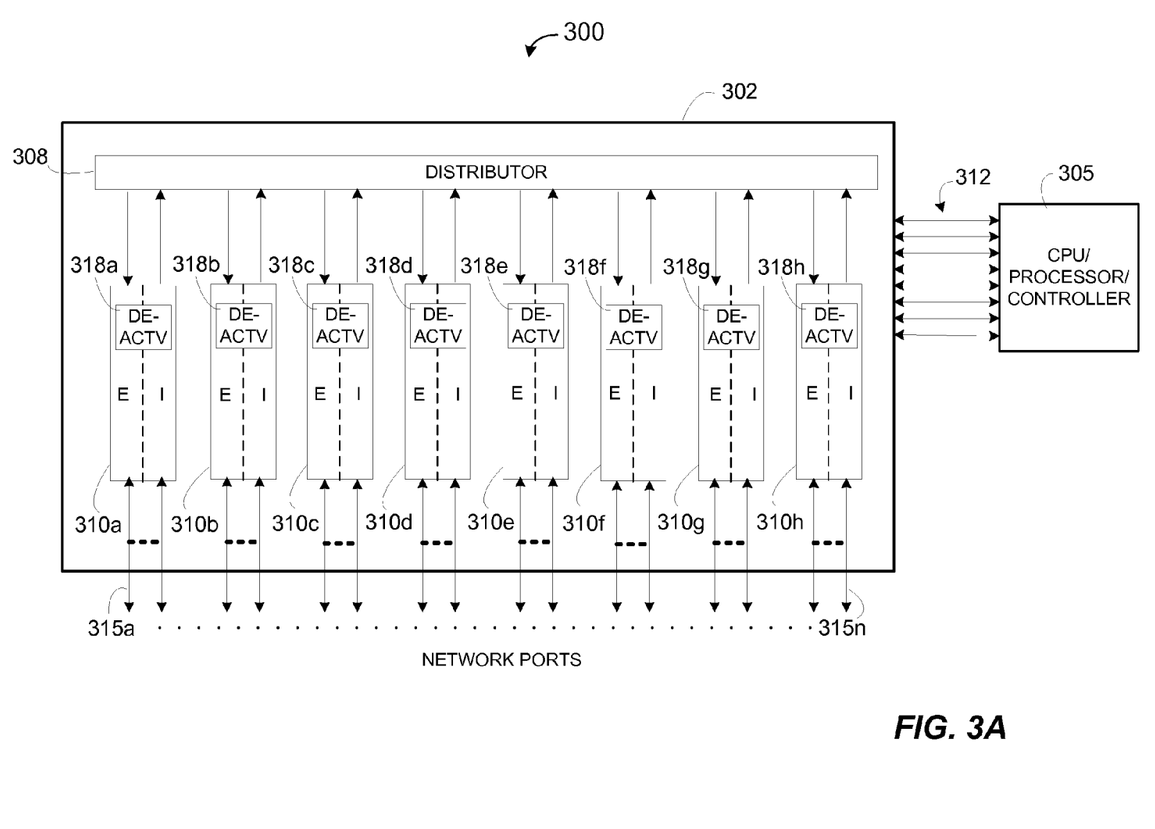
FIG. 3A is a block diagram of an example switching device for which all switch cores are active, according to an embodiment.
Figure 3B:
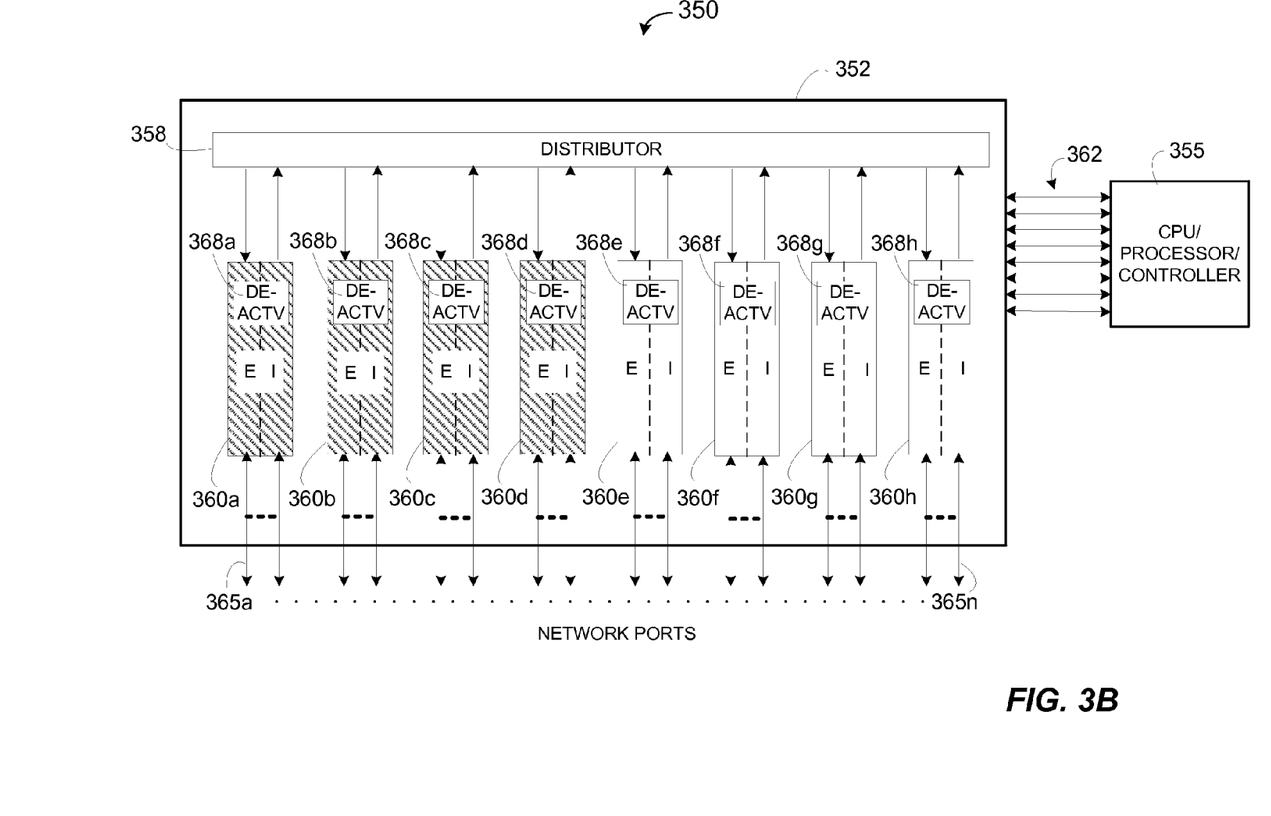
FIG. 3B is a block diagram of an example switching device for which a first number of switch cores are active and second number of switch cores are inactive, according to an embodiment.

FIGS. 3A and 3B are two illustrative examples of forwarding systems that use the techniques described herein. The forwarding systems include switching devices that have redundant or duplicative processing cores, where each activated processing core is configured to forward packets or data corresponding to packets in conjunction with other activated processing cores. For example, a packet may be forwarded using an activated ingress processing pipeline of a first core, and an activated egress processing pipeline of the first core or another core. FIGS. 3A and 3B use the techniques previously discussed with respect to FIGS. 1, 2A and 2B, and refers to reference numbers from FIGS. 1, 2A and 2B for clarity of discussion. It is noted that the switching devices shown in FIGS. 3A and 3B each include eight available switch cores in their common base configuration with each switch core having a respective ingress processing module or pipeline and a respective egress processing module or pipeline, although any suitable number of available switch cores may be used in a common base configuration.

FIG. 3A illustrates an example forwarding system 300 including a switching device 302 and a controller 305. In an embodiment, the controller 305 is similar to the CPU 120 of FIG. 1. The switching device 302 is implemented on an IC, such as the IC 102 of FIG. 1, in an embodiment. The switching device or IC 302 includes a distributor 308 and a base configuration of eight independent switch cores 310a-310h disposed thereon, where a plurality of switch cores is configured similarly to the dual switch core 150 of FIG. 2A. In another embodiment, one or more switch cores 310a-310h is configured similarly to the single switch core 200 of FIG. 2B. Each switch core 310a-310h includes an egress pipeline and an ingress pipeline (denoted by "E" and "I"). Each switch core 310a-310h is communicatively coupled to the processor or controller 305 (as denoted by the arrows 312) via a respective core interface (not shown in FIG. 3A), such as the core interfaces 116 of FIG. 1. In embodiment, a particular switch core is selected or designated to be the interface between the switching device 302 and the controller 305, and all core interfaces 116 are communicatively coupled 312 to the controller 305 using the designated or selected particular switch core. Each switch core 310 is coupled to a respective set of one or more network ports 315a-315n from which packets are received and through which packets are transmitted to other locations in a network.

In the example of FIG. 3A, a separate deactivator 318a-318h is illustrated as being included in each switch core 310a-310h. In another embodiment, a single deactivator that functions similarly to the separate deactivators 318 is separate from the switch cores 310. For example, each deactivator 318a-318h is a separate portion of a centralized deactivator, such as the deactivator 122 of FIG. 1, and each switch core 310a-310h is communicatively coupled to a respective portion 318a-318h of the centralized deactivator. In an embodiment, one of the deactivators 318a-318h is designated or selected to be the centralized deactivator. For example, deactivator 318h is selected to be the centralized deactivator for the switching device 300. In another embodiment, a single deactivator is coupled to more than one switch core 310a-310h but is not coupled to all of the switch cores 310a-310h.

Upon power up of the IC 302, the controller 305 determines a configuration ID, such as described above, of the switching device or IC 302 that indicates the active switch cores of the IC 302, the inactive switch cores of the IC 302, or both the active and inactive switch cores of the IC 302, in an embodiment.

In one example, the controller 305 reads a register of the IC 302 that stores the configuration ID. In another example, the controller 305 determines the configuration ID from a source external to the switching device 302, such as by accessing an external memory location that stores the configuration ID. Based on the switching device identification, the controller 305 determines the active cores 310. In the scenario of FIG. 3A, the configuration ID indicates that all cores 310 are active, and thus all of the network ports 315a-315n are available.

In the embodiment shown in FIG. 3A, at least one of the core interfaces (not shown) is communicatively coupled to the distributor 308 so that the controller 305 accesses the distributor 308 for configuration of the distributor 308.

As discussed above, the deactivator 318 determines, based on communication with the controller 305, which switch cores 310 are to be activated or deactivated. If a desired activation state of a particular switch core is determined to be "deactivated," the particular switch core is deactivated and/or isolated using any or all of the previously discussed techniques, such as shutting down power to the particular switch core, ignoring data packets destined for or received from the particular switch core, etc. In particular, the distributor 308 reroutes processing of packets to bypass those cores/processing pipelines that have been deactivated.

In some embodiments, a particular one of the core interfaces is coupled to the distributor 308 and is designated, by the controller 305, to configure the distributor 308. In the example shown in FIG. 3A, as all cores and respective ingress and egress processing pipelines 310 are active, the distributor 308 is configured to route data frames or packets between all of the network ports 315a-315n.

FIG. 3B illustrates an example forwarding system 350 including a switching device 352 and a controller 355. In an embodiment, the controller 355 is similar to the CPU 120 of FIG. 1. The switching device 352 is implemented on an IC, such as the IC 102 of FIG. 1, in an embodiment. The switching device or IC 352 includes a distributor 358 and a base configuration of eight independent switch cores 360a-360h disposed thereon, each pair of which is configured similarly to the switch core 150 of FIG. 2A, in an embodiment. In another embodiment, each switch core 360 is configured similarly to the switch core 200 of FIG. 2B. Each switch core 360a-360h includes an egress pipeline and an ingress pipeline (denoted by "E" and "I"). Each switch core 360a-360h is communicatively coupled to the processor or controller 355 (as denoted by the arrows 362) via a respective core interface (not shown in FIG. 3B), such as the core interfaces 116 of FIG. 1. Each switch core is coupled to a respective set of one or more network ports 365a-365n from which packets are received and to which packets are delivered.

In the example of FIG. 3B, a separate deactivator 368a-368h is illustrated as being included in each switch core 360a-360h. In another embodiment, a single deactivator that functions similarly to the separate deactivators 368 is separate from the switch cores 360. For example, each deactivator 368a-368h is a separate portion of a centralized deactivator, such as the deactivator 122 of FIG. 1, and each switch core 360a-360h is communicatively coupled to a respective portion 368a-368h of the centralized deactivator. In an embodiment, one of the deactivators 368a-368h is designated or selected to be the centralized deactivator. For example, deactivator 368a is selected to be the centralized deactivator for the switching device 300.

In an embodiment, upon power up of the IC 352, the controller 355 determines identification configuration ID of the switching device or IC 352, in a manner similar to discussed with respect to FIG. 3A.

In some embodiments, the controller 355 reads a register of the IC 352 that indicates the configuration ID. In other embodiments, the controller 355 determines the configuration ID from a source external to the switching device 352, such as by accessing an external memory location that stores the configuration ID. Based on the configuration ID, the controller 355 determines that only cores 360e-360h are active, so that only half of the network ports 365a-365n corresponding to the cores 360e-360h are available.

The deactivator 368 determines which switch cores are to be activated or deactivated. In FIG. 3B, switch cores 360a-360d are deactivated using any or all of the previously discussed deactivation techniques as desired, as indicated by the shading. In one example, if a desired activation state of a particular switch core is determined to be "deactivated," the particular switch core is deactivated, and the distributor 308 reroutes processing of packets to bypass those cores/processing pipelines that have been deactivated (e.g., switch cores 360a-360d).

Similar to FIG. 3A, in some embodiments, a particular one of the core interfaces is designated to configure the distributor 358. In the example shown in FIG. 3B, the distributor 358 is configured to route data frames or packets between all active cores. In FIG. 3B, as only cores 360e-360h and their respective ingress and egress processing pipelines are activated, the distributor 358 is configured to route data packets between only the subset of network ports 365a-365n corresponding to activated cores 360e-360h. Accordingly, in FIG. 3B, the activated cores 360e-360h are functionally redundant to the deactivated cores 360a-360d.

Figure 4:
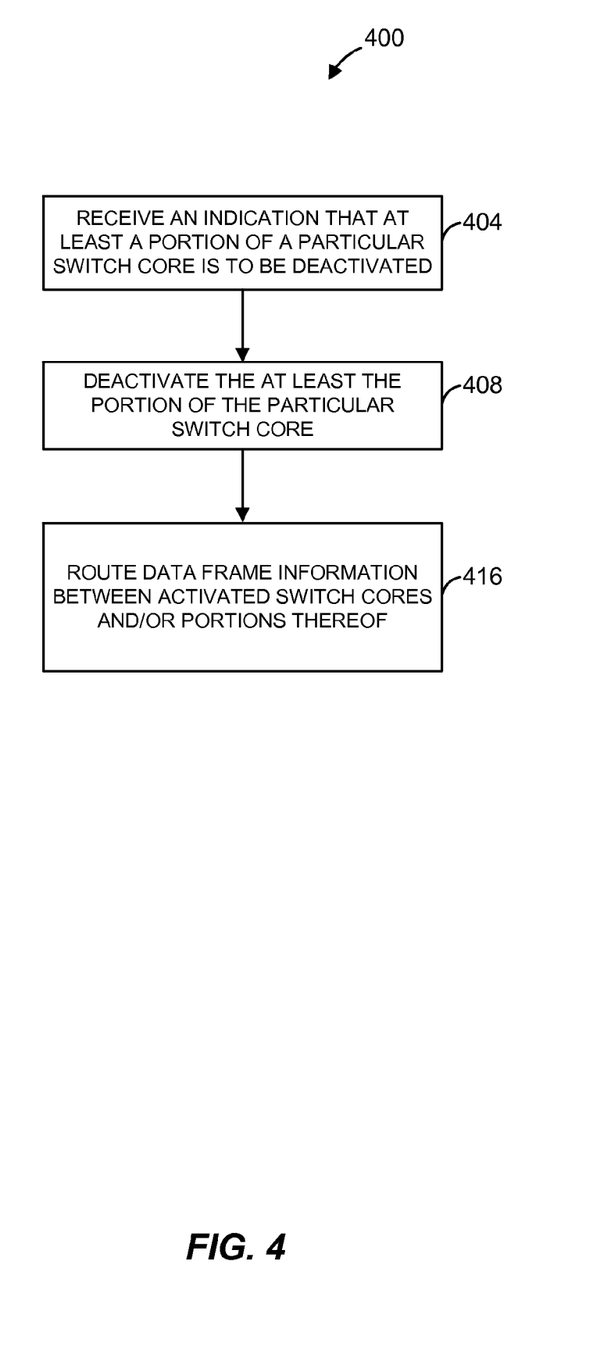
FIG. 4 is a flow diagram of an example method that is implemented by the IC of FIG. 1, the switch core of FIG. 2, and/or the switch core of FIG. 3, according to an embodiment.

FIG. 4 is a flow diagram of an example method 400 that is implemented by the IC 102 of FIG. 1, the IC 302 of FIG. 3A, the IC 352 of FIG. 3B, the switch core 150 of FIG. 2A, and/or the switch core 200 of FIG. 2B, according to an embodiment. The method 400 is implemented by other suitable systems that utilize multiple switch cores and a distributor to forward data frames and/or descriptors between the switch cores, in other embodiments. Additionally, in an embodiment, the IC 102 of FIG. 1, the IC 302 of FIG. 3A, the IC 352 of FIG. 3B, the switch core 150 of FIG. 2A, and/or the switch core 200 of FIG. 2B implement other suitable methods as an alternative to implementing the example method 400. For ease of explanation, the method 400 is described with reference to FIGS. 1, 2A, and 2B.

At block 404, an indication is received that one or more switch cores, or a portion thereof, is to be deactivated. For example, one or more switch cores or a portion thereof is to be deactivated due to a processing defect or failure of a given core (or processing pipe) to pass qualification, or due to business reasons where only a reduced functionality switch device is required. In an embodiment, upon power up of an IC 102, the deactivator 122 receives information indicating one or more switch cores 104 or portions thereof to be deactivated, in an embodiment. The deactivator 122 receives the information via a plurality of signal contacts, a memory unit, such as a register, a non-volatile memory unit, etc., via contacts of an IC package or via the external controller 120, in various embodiments.

At block 408, the one or more switch cores 104, or portion thereof (such as the ingress processing pipeline or the egress processing pipeline), indicated at the block 404 is deactivated. For example, the entire switch core is deactivated using one or more of the previously discussed deactivation techniques or another suitable deactivation technique.

At block 416, packets are processed between only pipelines, cores, and associated physical components such as SERDES and ports that are indicated to be active, in an embodiment. For example, the distributor 108 is configured to route data frame information or packets between activated switch cores or portions thereof, and to ignore or re-route data frame information or packets corresponding to deactivated switch cores 104 or portions thereof.

Each of the blocks of FIGS. 1, 2A, 2B, 3A, and 3B, and the method 400 of FIG. 4 are implemented by hardware, in some embodiments. More generally, however, in some embodiments, at least some of the blocks of FIGS. 1, 2A, 2B, 3A, and 3B, and the method 400 of FIG. 4 are implemented using a processor executing firmware instructions, a processor executing software instructions, or any combination thereof. When a block is implemented at least partially using a processor that executes software instructions, the software is stored in any suitable non-transitory, tangible computer readable memory such as on a magnetic disk, an optical disk, or other storage medium, in a RAM or ROM or flash memory of a computer, processor, hard disk drive, optical disk drive, tape drive, etc.

When implemented in hardware, the hardware comprises, in general, one or more of discrete components, an integrated circuit, an application-specific integrated circuit (ASIC), etc. Referring to FIG. 1, in an embodiment, the forwarding system 100 is implemented on a single integrated circuit (IC), and the CPU 120 is implemented on the same IC as the system 100 or on a separate IC that communicates with system 100. In one embodiment, the system 100 is implemented on a single ASIC, and the CPU 120 is implemented on a separate IC.

Figure 5:
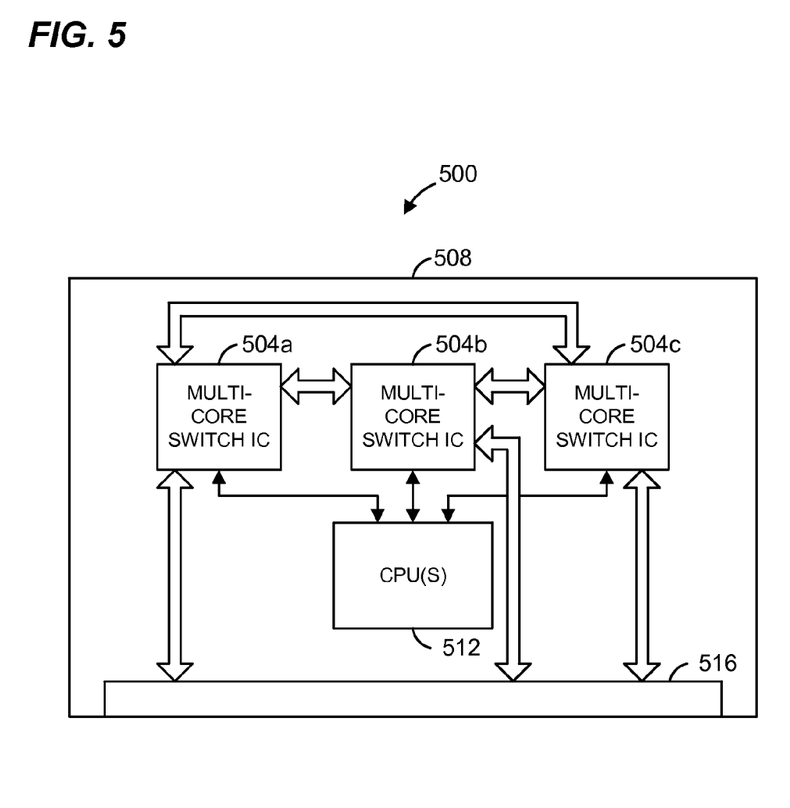
FIG. 5 is a block diagram of an example switch system that utilizes the integrated circuit of FIG. 1, according to an embodiment.

FIG. 5 is a block diagram of an example switch device, network device, or switch system 500. The switch system 500 includes a plurality of switch ICs 504 mounted on a printed circuit board (PCB) 508. Each of the switch ICs 504 are the same as or similar to the switch IC 102 of FIG. 1, in an embodiment. In an embodiment, each switch IC 504 has ports coupled to ports of one or more of the other switch ICs 504. One or more CPUs, processors or controllers 512 are coupled to the switch ICs 504 and are mounted to the printed circuit board 508. The printed circuit board includes one or more connectors 516 for port interconnections with other switches, servers, trunks, etc., in an embodiment. One or more of the switch ICs 504 has ports coupled to the connectors 516, in an embodiment. The switch device 500 is capable of supporting a large number of ports.

In another embodiment, each switch IC 504 is disposed on a separate PCB, and each IC 504 shares a common CPU 512. In this embodiment, the CPU 512 is disposed on the same the PCB on which one of the switch ICs 504 is disposed, or on a separate PCB.

Techniques disclosed herein may be applied to the switch or network device 500 on an application specific basis to meet business needs or as otherwise desired. In one example, a generic high-volume network device 500 is manufactured, and various desired cores or portions of cores are deactivated to support different applications. In another example, all cores 504a-504c of a switch or network device 500 are fully activated, and when one or more cores or portions thereof degrades over time, the degraded portions are deactivated so that the network device 500 remains useable, at least partially.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A network switch device, comprising:
   a plurality of ports for receiving and transmitting data frames on a network;
   a plurality of switch cores disposed on a single integrated circuit, each switch core being locally coupled to a respective subset of the plurality of ports, and the each switch core configured to determine target ports, from among the plurality of ports, including ports not in the respective subset, via which received data frames are to be transmitted; and
   a deactivator configured to selectively deactivate at least a portion of one or more switch cores among the plurality of switch cores on the single integrated circuit, the network switch device being configured to forward the data frames among the plurality of ports based on a configuration of active portions of the plurality of switch cores.

2. The network switch device according to claim 1, wherein the deactivator is disposed on the single integrated circuit.

3. The network switch device according to claim 1, wherein the deactivator is configured to deactivate at least one of an ingress processing pipeline of a particular switch core or an egress processing pipeline of the particular switch core.

4. The network switch device according to claim 1, wherein the deactivator is configured to deactivate the at least the portion of the one or more switch cores by isolating the at least the portion of the one or more switch cores from power on the single integrated circuit.

5. The network switch device according to claim 1, further comprising distributor disposed on the single integrated circuit and coupled to an ingress processing pipeline and an egress processing pipeline of each of the plurality of switch cores,
wherein data frame information is transferred between the plurality of switch cores via the distributor, and
wherein the distributor is configured to route the data frame information based on a configuration of active ingress processing pipelines and active egress processing pipelines of the plurality of switch cores.

6. The network switch device according to claim 1, wherein the deactivator is further configured to determine the at least the portion of the one or more switch cores to be deactivated based on a configuration identifier on the single integrated circuit.

7. The network switch device according to claim 1, further comprising an interface to a controller, and wherein the network switch device receives, using the interface to the controller, an indication of the at least the portion of the one or more switch cores to be deactivated.

8. The network switch device of claim 7, wherein one of the plurality of switch cores is designated as the interface to the controller.

9. The network switch device according to claim 1, wherein the each switch core includes a respective portion of the deactivator.

10. The network switch device according to claim 1, wherein the deactivator is configured to selectively deactivate the at least the portion of one or more switch cores among the plurality of switch cores on the single integrated circuit based on a dynamic, real-time programming of the single integrated circuit.

11. A method, comprising:
selectively deactivating at least a portion of one or more switch cores among a plurality of switch cores disposed on a single integrated circuit of a network switch device, wherein:
each switch core of the plurality of switch cores is locally coupled to a respective subset of a plurality of ports, the plurality of ports for receiving and transmitting data frames on a network that includes the network switch device, and
each switch core is configured to determine target ports, selected from the plurality of ports, including ports not in the respective subset, via which received data frames are to be transmitted; and
configuring, based on a configuration of active portions of the plurality of switch cores, the network switch device to forward the data frames among ports corresponding to the active portions of the plurality of switch cores.

12. The method according to claim 11, wherein selectively deactivating the at least the portion of the one or more switch cores comprises selectively deactivating an ingress processing pipeline or an egress processing pipeline of an particular switch core.

13. The method according to claim 11, wherein selectively deactivating the at least the portion of the one or more switch cores comprises selectively deactivating an entire switch core.

14. The method according to claim 11, wherein selectively deactivating the at least the portion of the one or more switch cores comprises isolating the at least the portion of the one or more switch cores from power on the single integrated circuit.

15. The method according to claim 11, further comprising routing the data frames between the active portions of the plurality of switch cores.

16. The method according to claim 15, further comprising preventing a routing of any data frames corresponding to deactivated portions of the plurality of switch cores.

17. The method according to claim 11, wherein selectively deactivating the at least the portion of the at least the portion of the one or more switch cores comprises selectively deactivating the at least the portion of the at least the portion of the one or more switch cores based on a configuration identifier on the single integrated circuit.

18. The method according to claim 11, wherein selectively deactivating the at least the portion of the at least the portion of the one or more switch cores comprises selectively deactivating the at least the portion of the at least the portion of the one or more switch cores based on a dynamic, real-time programming of the single integrated circuit.

19. The method according to claim 11, wherein:
the network switch device is communicatively coupled to a controller; and
selectively deactivating the at least the portion of the one or more switch cores comprises selectively deactivating the at least the portion of the one or more switch cores based on an indication received from the controller.

20. The method according to claim 19, further comprising selecting one of the plurality of switch cores to serve as an interface between the network switch device and the controller.

* * * * *